March 2, 1965  R. C. L. CROMMEN  3,171,297
PROGRAMMMING DEVICES

Filed July 28, 1961  3 Sheets-Sheet 1

INVENTOR:
ROGER CHARLES LÉON
CROMMEN
By *[signature]*
ATTORNEY

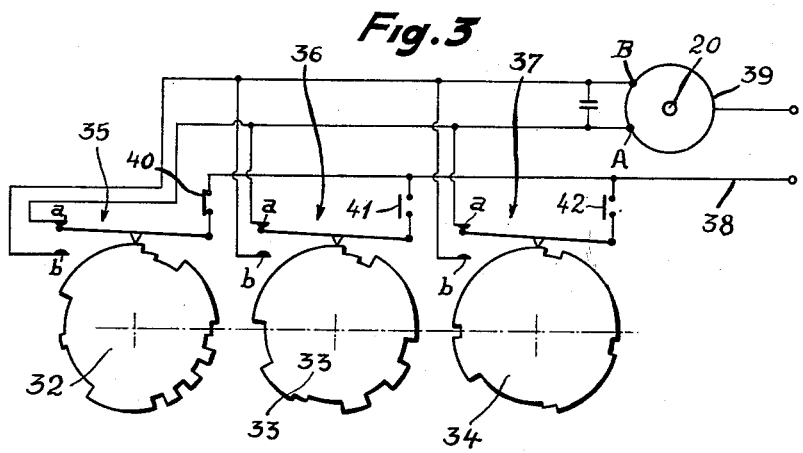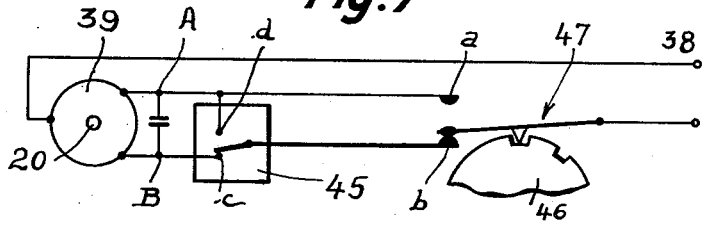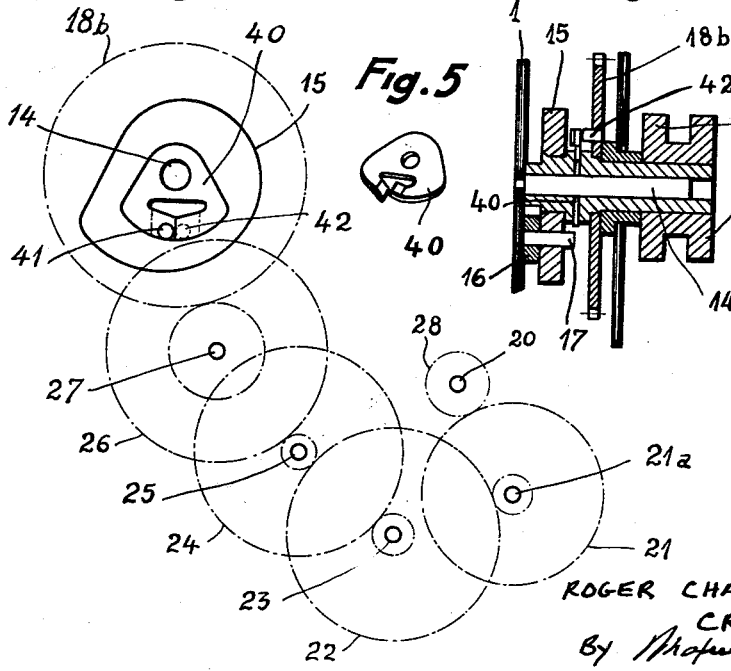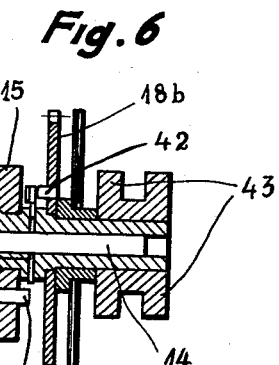

March 2, 1965

R. C. L. CROMMEN 3,171,297

PROGRAMMMING DEVICES

Filed July 28, 1961

INVENTOR
Roger Charles Léon Crommen

By Maxwell E. Sparrow
ATTORNEY 3,171,297
PROGRAMMING DEVICES
Roger Charles Léon Crommen, Valence, France, assignor to Crouzet, Valence, France, a French company
Filed July 28, 1961, Ser. No. 142,465
Claims priority, application France, July 30, 1960, 601, Patent 1,271,264; Mar. 11, 1961, 608, Patent 79,626
10 Claims. (Cl. 74—472)

The present invention relates to mechanisms for the control of programming devices and is based on a special and new use of driving means having constant speed and two directions of rotation, each direction of rotation being in this case employed to produce a pre-determined controlling action, such as the driving speed of a driven member, the selective control of driven members, etc.

So it is that, in a programming device in accordance with the invention and comprising an electric motor, preferably a synchronous motor, having two directions of rotation, the change in the direction of rotation is employed either to produce the movement at two different speeds but in a single and same direction of rotation, of a step-by-step driving mechanism of the said programming device (for example a programming device intended to be employed on an automatic clothes-washing machine), or to produce, in one direction of rotation of the motor, the simultaneous movement, on the one hand, of a member of the said step-by-step mechanism of the programming device and, on the other hand, of a control member of the machine which is controlled by the said programming device (for example the change-over switch of the motor which drives the perforated cylinder of the said machine), whereas the other direction of rotation of the motor is employed to actuate only the control member in question (for example the change-over switch referred to above).

In one form of embodiment of a programming device and in accordance with the present invention, the said programming device is therefore characterized in that it comprises: a motor having two directions of rotation and controlled by a change-over switch; a step-by-step driving mechanism actuating a programming cam or drum which controls a complete cycle of operations, and at least one selecting cam which co-operates with the change-over switch controlling the direction of rotation of the motor; and transmission means for effecting the mechanical coupling between the said motor and said step-by-step driving mechanism, the said transmission means comprising, on the one hand, a kinematic chain formed by a number of gear-trains, each having a toothed wheel integral with a pinion and, on the other hand, a driving pinion driven by the motor and mounted on a rocking support which plays the part of a unidirectional coupling means, the pivotal axis of which coincides with the shaft of the said motor and is adapted to take up two positions, in each of which the said driving pinion actuates a different toothed wheel from the gear-trains, the arrangement of the said transmission means being such however that, irrespective of the direction of rotation of the motor, the direction of rotation of the gear-trains (which actuate the step-by-step driving mechanism) remains unchanged.

In a preferred form of embodiment of the programming device referred to above, the driving pinion which is actuated by the motor can, in each of the two positions of the rocking support, come into engagement respectively with one of the toothed wheels of the kinematic chain and with a countershaft pinion which engages with that toothed wheel which follows immediately after the wheel which is nearest to the first toothed wheel mentioned.

In order to permit a pre-selection between a number of cycles of operation, the programming device comprises a number of selecting cams actuated by the step-by-step mechanism (and for example keyed on the output shaft of the said mechanism), the homologous fixed contacts of the change-over switches associated with the selecting cams being mounted in parallel and connected to the two reversing terminals of the motor, while the movable contact (which is operated by the corresponding cam) of each change-over switch is connected to a supply conductor through a switch, the arrangement of the various switches being such that only one switch at a time can be brought into the position of closure for the purpose of selecting that cam which it is intended to employ for the desired cycle of operations.

In another form of embodiment of a programming device and in accordance with the invention, the said programming device is characterized in that it comprises a motor which has two directions of rotation and which imparts movement, through the intermediary of transmission means comprising a kinematic chain formed by a number of gear-trains each having a toothed wheel integral with a pinion, on the one hand, directly to a rotary control member which operates indistinctly in one direction or in the other and, on the other hand, imparts movement through the intermediary of unidirectional coupling means to the step-by-step driving mechanism which actuates a programming drum or cam, this being achieved in such manner that, in one direction of rotation of the motor and of the transmission means, the said motor operates the step-by-step driving mechanism of the programming device and the rotary control member, while in the other direction of rotation of the motor, this latter only actuates the rotary control member (the step-by-step driving mechanism being then disengaged).

In the case in which the device is used for controlling the cycle of operations of a washing machine, the rotary control member is, for example, a cam which works on the change-over switch for producing a change in the direction of rotation of the motor which causes the perforated cylinder of the washer to rotate, while the directions of rotation of the motor of the programming device are controlled by auxiliary control means such as a thermostat which can thus suspend the action of the programming device until the water of the washing machine has reached a certain temperature, the perforated cylinder of the said machine being nevertheless driven during the period prior to the operation of the thermostat.

The means for unidirectional coupling preferably consist of a ratchet system interposed between the step-by-step driving mechanism and the last element of the kinematic chain. It will naturally be understood that any suitable "free-wheel" system can serve as unidirectional coupling means.

The step-by-step driving mechanism is characterized in that the energy of the motor is stored in a spring which is periodically stretched by means of a cam working on a driving pawl which is periodically released by the said cam so as to set in motion a ratchet wheel which is keyed on the output shaft of the mechanism.

In a preferable form of embodiment of the step-by-step driving mechanism, this latter is further characterized by the following points and combinations thereof:

One end of the energy-accumulating spring is hooked on to the free extremity of an oscillating lever, the other extremity of which pivots on a fixed pin, the said lever being provided between its extremities with a roller which is mounted to rotate freely and is applied against the cam, there being fixed, on one face of the said cam, a stud serving as a spindle for a roller which controls the driving pawl, the said stud being engaged in a groove which embraces an arc in the vicinity of 90° and which is formed in the last wheel of the kinematic chain which is co-axial to the said cam, the profile of which is such that the lever referred to above is first slowly forced back by the cam and stretches the spring and that, after having moved past the highest point, the lever then imparts, on the contrary, a sudden forward movement to the cam, this forward movement being made possible by the groove referred to above;

The driving pawl is provided with an elongated slot by means of which the said pawl is permitted to execute both a pivotal movement about a fixed pin engaged in the said elongated slot and a movement of translation with respect to the said pin. The said pawl is provided with: a catch intended to come into engagement with the ratchet wheel; a lug on which is hooked the other end of the energy-accumulating spring which tends to cause the pawl to pivot so as to ensure that the pawl catch engages with the ratchet wheel; a heel subjected to the thrust of the roller mounted on the cam which co-operates with the oscillating lever, the said heel moving away from the said roller, in a certain position of the cam, thereby permitting the energy-accumulating spring to displace the pawl rapidly so as to cause the said pawl to co-operate with the ratchet wheel and to set this latter in motion;

A retaining-pawl subjected to the action of a spring prevents the return movement of the ratchet wheel each time that the catch of the driving pawl slides back over a tooth of the ratchet wheel.

Further particular features and characteristics of the present invention will be brought out by the description which follows below, and which relates to a few forms of embodiment of improved programming devices in accordance with the said invention, the said forms of embodiment being given solely by way of example and not in any sense by way of limitation, and being illustrated diagrammatically in the accompanying drawings, in which:

FIG. 3 is a diagram illustrating three selecting cams actuated in dependence on a motor having two directions of rotation, for example, through the intermediary of the transmission means of FIG. 2 and by means of the step-by-step driving mechanism, which has not been shown on this figure, but which can be that of FIG. 1;

FIG. 4 is another diagram of transmission means between the motor having two directions of rotation and the step-by-step driving mechanism of a programming device;

FIG. 5 is a view in perspective of an element of the ratchet system;

FIG. 6 is a view in cross-section of the output portion of the transmission means;

FIG. 7 is a diagram illustrating the system by means of which the direction of rotation of the motor is made dependent on a thermostat;

Figure 1:
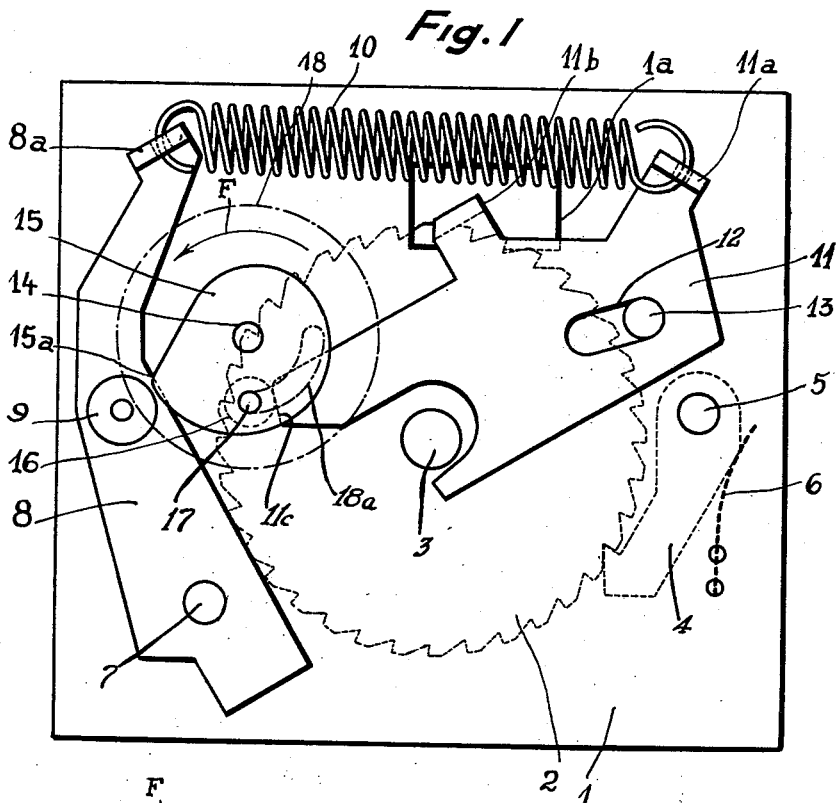
FIG. 1 is a view in elevation of the step-by-step driving mechanism of a programming device.
Figure 8:
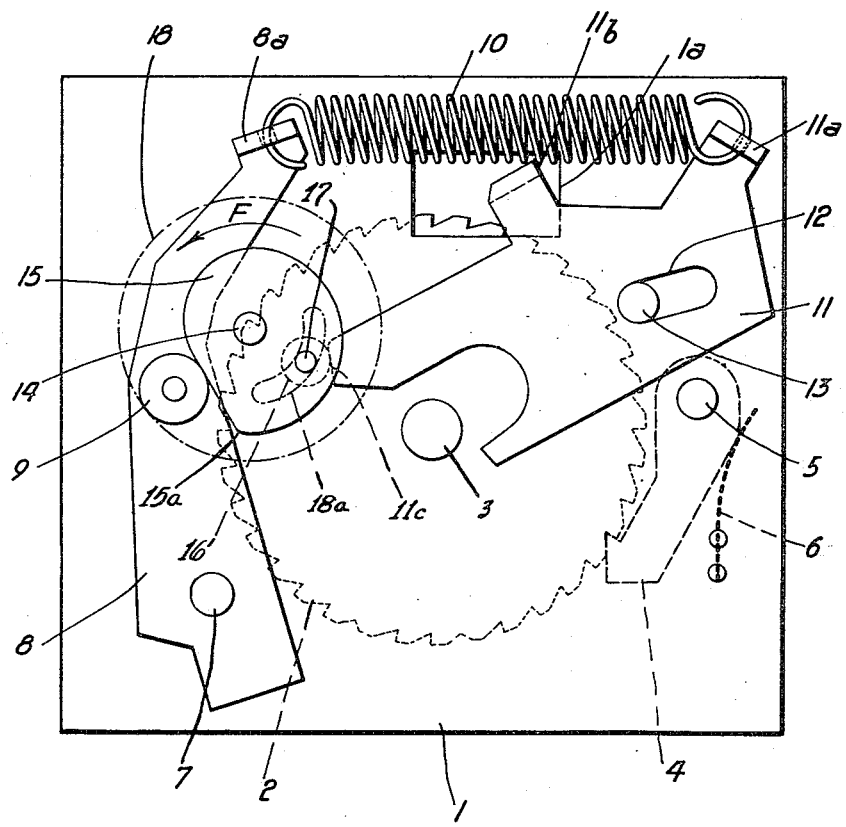

Finally, FIG. 8 is a view similar to FIG. 1, the step-by-step driving mechanism being in the actuated position.

The step-by-step driving mechanism, which is operated by constant-speed driving means and on the output shaft 3 of which are keyed selecting cams and the programming drum, comprises a supporting plate 1, on one face of which is located a ratchet wheel 2 which is also keyed on the output shaft 3 and a holding or retaining-pawl 4 which is pivotally mounted at 5 and which is subjected to the action of a spring 6 for the purpose of immobilizing the ratchet wheel 2 during the periods in which this latter is not actuated by the driving pawl which will be referred to below.

On the other face of the supporting-plate, a lever 8 is pivotally mounted at 7 and carries a roller 9, the free extremity 8a of the said lever serving as a point of attachment for energy-accumulating spring 10.

On the same face of the supporting-plate is located the driving pawl 11 in which is formed an elongated slot 12, and inside this latter is engaged a pin 13. The driving pawl 11 comprises a lug 11a on to which is hooked the other end of the spring 10, a control catch 11b which passes through a window 1a of the supporting-plate 1 and is intended to cooperate with the teeth of the ratchet wheel 2, and a heel 11c, the object of which will be brought out in the description which follows below.

A cam 15 is designed to rotate on an axle 14 and is provided on one face thereof with a snug 17 on which is mounted a roller 16. The said snug 17 passes through the incurved opening 18a (which extends over an arc of approximately 90°) of a driving wheel 18 which rotates on the same axle 14 as the cam 15, in the direction of the arrow F.

The cam 15 co-operates with the roller 9 of the lever 8, while the roller 16 co-operates with the heel 11c of the driving pawl 11, the wheel 18 being driven at constant speed by driving means such as a synchronous motor having two directions of rotation.

When the wheel 18 rotates, it drives the cam 15 through the intermediary of the snug 17 of the roller 18 and of the incurved opening 18a. This driven movement of the cam 15 is such that, in the course of its rotation, the said cam applies pressure through the intermediary of the roller 9 and forces back the lever 8 which stretches the spring, this movement lasting until the said roller 9 has passed beyond the highest point 15a of the said cam. At this moment, it is the above-mentioned cam which is suddenly actuated by the said lever 8, again in the direction of the arrow F, by virtue of the freedom of movement of the snug 17 inside the opening 18a and under the action of the energy previously accumulated by the spring 10.

It can be seen that, during three-quarters of a revolution of the cam 15, the spring 10 progressively accumulates the energy supplied to the mechanism through the intermediary of the wheel 18, following which the spring in question suddenly restores this energy, but without disturbing the movement of the wheel 18.

The spring 10 tends to bring the driving pawl 11 into the position illustrated in FIG. 1, that is to say, in which one extremity of the elongated slot 12 comes into abutment against the pin 13, while the control catch 11b abuts against a tooth recess of the ratchet wheel 2. During the sudden rotation of the cam 15, under the combined action of the members 8, 9, 10, the roller 16 forces back the heel 11c of the driving pawl 11 and allows the control catch 11b to slide back over the profile of a tooth of the ratch wheel 2. The position assumed at this time by the various components 8, 10, 11, 15, 16, 17 described above is shown on FIG. 8. As soon as the displacement of the driving pawl 11 is sufficient to permit the control catch 11b to fall back into the following tooth recess of the ratchet wheel, the said driving pawl pivots about the pin 13 under the action of the spring 10, thereby causing the heel 11c to move away from the roller 16. Being then subjected only to the action of the spring 10, the driving pawl 11 moves again suddenly in order to return to the position shown in FIG. 1 and, during this movement, its control catch 11b engages the next tooth recess and causes the ratchet wheel 2 to move forward by one tooth. During the backward movement of the driving pawl 11, the ratchet wheel 2 is held motionless by the pawl 4.

It will be observed that the path of backward travel of the driving pawl 11 depends, to a certain extent, only on the shape of the ratchet-wheel teeth, with the result that the replacement of one ratchet wheel by another which has a different number of teeth does not disturb the general operation of the step-by-step driving mechanism.

The position of the roller 16 on the cam 15 is chosen so that the backward movement of the driving pawl 11 coincides with the phase in which the energy of the spring 10 is restored through the intermediary of the cam 15. It can thus be seen that the energy which is necessary for the forward travel of the ratchet wheel is supplied, at the moment of this forward movement, only by the spring 10, and independently of the speed of rotation of the wheel 18. This forward movement of the ratchet wheel takes place even if it has the effect of cutting off the supply of electric current to the synchronous motor which drives the mechanism.

It is the choice of the position of the roller 9 on the lever 8, on the one hand, and the outline of the cam 15, on the other hand, which make it possible to employ only a single spring 10 which works continuously, in view of the fact that the movement of displacement of the extremity 8a of the lever 8 is more rapid than the movement of displacement of the lug 11a of the driving pawl 11.

It will be observed that the catch 11b of the driving pawl 11 is maintained in engagement with the set of teeth of the ratchet wheel 2 only under the action of the spring 10. The pawl 11 does not therefore prevent the ratchet wheel 2 from being driven by an external force, in the normal direction of rotation. It will be noted however, that the rocking movement of the driving pawl 11 can only take place if the heel 11c does not come into contact with the projecting portion of the shaft 3.

The programming device is additionally provided with a programming drum or cam which is keyed on the shaft 3 and effects the automatic control of the operations. This drum, which does not form a part of the invention, has not been illustrated in the drawings.

Figure 2:
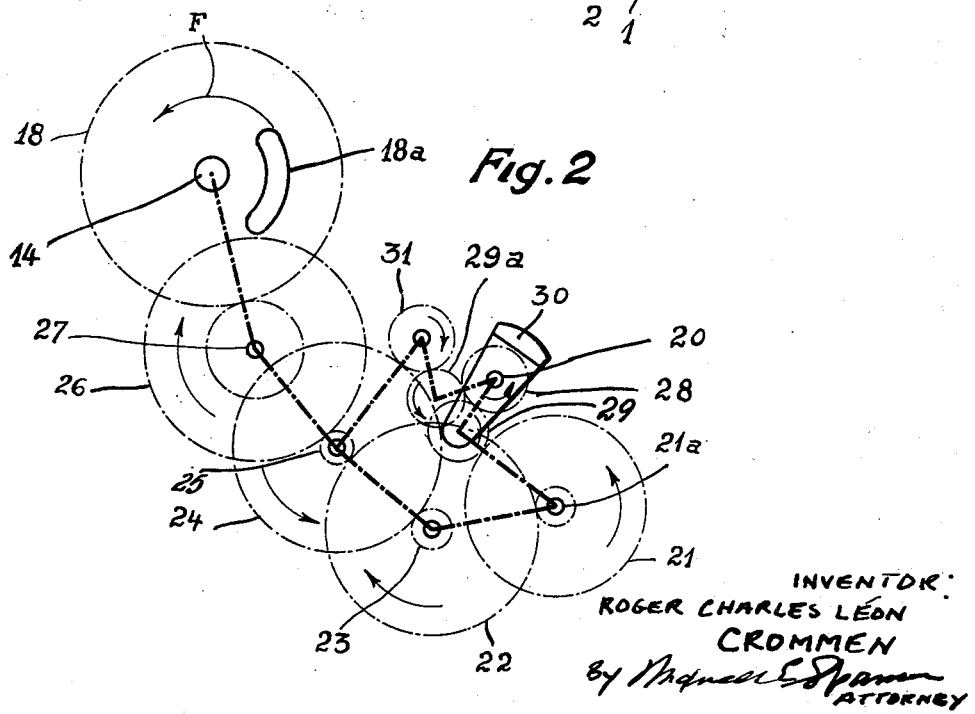
FIG. 2 is a diagram of the means for transmission between a synchronous motor having two directions of rotation and the step-by-step driving mechanism of the programming device, for example the mechanism of FIG. 1.

It has been assumed in FIG. 2 that the wheel 18 is the last element of the kinematic chain constituting the transmission means between a synchronous motor having two directions of rotation and the shaft of which is shown at 20, and the step-by-step driving mechanism of the programming device.

The kinematic chain comprises in this case the different gear trains such as the gear train 21 (which rotates about the axis 21a), the gear train 22 (which rotates about the axis 23), the gear train 24 (rotating about the axis 25), and the gear train 26 (rotating about the axis 27), each gear train comprising a toothed wheel which is integral with a pinion. On the shaft 20 of the motor is keyed the driving pinion 28 which is in mesh with a driving pnion 29 mounted on a rocking support 30, the pivotal axis of which coincides with the shaft 20. In the position shown in FIG. 2 and in one pre-determined direction of rotation of the motor, the pinion 29 is automatically in mesh with the toothed wheel of the gear train 21.

As soon as the direction of rotation of the motor is reversed, the suprt 30 is automatically pivotally drawn and swings over and the pinion 29 is brought into the position 29a, in which the said pinion engages with a countershaft pinion 31 which is constantly in mesh with the wheel of the gear train 24. It can be seen that, irrespective of the direction of rotation of the motor, all the gear trains of the kinematic chain always rotate in the same direction but at different speeds according to the direction of rotation of the motor.

It thus follows that it is possible, with a synchronous motor having two directions of rotation, to operate the step-by-step driving mechanism of FIG. 1 at two different speeds, the selection of these speeds being then effected by means of a simple change-over switch operated by a selecting cam keyed on the shaft 3 (or by the chain-over switch which is associated with each selecting cam) of the driving mechanism, as will be seen below.

As regards the mechanism and the kinematic chain which have just been described, it is useful to note that they provide the following advantages:

Step-by-step driving of the output shaft of the driving mechanism in such manner that the forward movement is constant, rapid, and independent of the power supply to the motor;

The possibility of modifying the number of angular stopping positions of the shaft referred-to above, simply by replacing a ratchet wheel;

Finally, the possibility of modifying the length of the stopping periods of the mechanism by simple electric switching, the effect of which is to reverse the direction of rotation of the driving motor.

In FIG. 3 there have been illustrated three selecting cams 32, 33, 34, which are all keyed on the output shaft 3 of the driving device of FIG. 1.

Each of these cams corresponds to a complete work cycle of a machine, for example a washing machine. The work cycle correponds to a complete revolution of a cam and is unvarying, since it only depends on the profile of each cam which is driven at equal intervals of time. The user can only modify the point of starting or stopping of the cycle. With a number of selecting cams keyed on the output shaft 3, the user has the possibility of choosing a cycle corresponding to the nature of the work to be effected, at the time of starting up the machine.

The cams 32 to 34 control respectively the change-over switches 35, 36 and 37. All the movable contacts of these change-over switches are connected to a phase conductor 38 of the motor 39 (the motor provided with the shaft 20 of FIG. 2) through the intermediary of switches 40, 41 and 42 respectively. These switches 40, 41 and 42 are arranged in such manner that only one of said switches can be closed at a time, the two other switches being necessarily open. In other words, the choice of the particular switch to be closed therefore determines the user's choice of a particular cam. All the fixed contacts a of the change-over switches 35, 36 and 37 are connected to the terminal A of the motor 39, while all the fixed contacts b of the said change-over switches are connected to the terminal B of the motor 39 referred-to above, the terminal A corresponding to one predetermined direction of rotation of the motor, while the terminal B corresponds to the other direction of rotation.

It will be observed that the selecting cams 32 to 34 have profiles such that the movable contact of the corresponding change-over switch touches either the fixed contact a or the fixed contact b.

As has been stated above, the drum controlling the operations (although the said drum has not been shown in the drawings) is also mounted on the output shaft 3, while the selecting cams 32 to 34 come into operation only in order to control the direction of rotation of the motor, or in other words the length of the stopping periods between each step-by-step forward movement of the driving mechanism.

As will be seen below, the operation of the selecting contacts of the change-over switches can be combined with that of the thermostat which controls the washing temperature in an automatic washing machine, this being effected in such manner that the longest operations are associated with the highest washing temperatures, thereby resulting in a simplification of the operation of the machine. In the case in which the machine is fitted with an adjustable thermostat, this latter does not effect the control of the pre-wash temperature. The combined operation proposed above then makes it possible to vary the pre-wash time in dependence on the temperature.

This time is indicated by means of the adjustable thermostat, which also ensures the preselection of the washing times, which is a particularly valuable arrangement when making use of the prewash operation for washing fine linen followed by final drying for a short period.

Certain washing machines of the perforated cylinder type comprise a time-relay change-over switch which has the effect of modifying at regular intervals of time the connections to the motor of the machine, in such manner that the perforated cylinder rotates for a certain period of time in one direction, stops, then turns in the other direction and so on during the entire washing operation. The time-relay device of the change-over switch is usually fitted with a small separate motor. This change-over device can be grouped together with the programming device which forms the object of the invention in such manner as to eliminate the separate motor, while the two-way synchronous motor of the programming device then simultaneously effects the operation of the programming device and the operation of the change-over unit of the motor of the machine.

In an arrangement of this kind and in accordance with the invention, the pinion 28 of the two way motor 39 is constantly in mesh (as shown in FIG. 4) with the wheel 21 of the kinematic chain terminating in the wheel 18b. The cam 15 of the step-by-step driving mechanism is actuated in one direction only by the wheel 18b by means of a unidirectional coupling mechanism consisting of an elastic catch 40 adapted to pivot about the fixed pin 14 and having two escapement teeth which are orientated in directions opposite to each other and which co-operate with locking-pins 41 and 42 carried respectively by the cam 15 and the wheel 18b, the arrangement being such that the cam is actuated by the catch 40 only in one direction of rotation of the wheel 18b.

Moreover, the wheel 18b is rigidly coupled for rotation to cams 43, the function of these cams being to operate the direction-reversing switch of the motor which drives the washing cylinder of the machine, the said cams being so designed as to effect this operation irrespective of the direction in which they rotate. Under these conditions, when the motor 39 rotates in a certain direction, the said motor drives at the same time both the step-by-step driving mechanism of the programming device as well as the cams 43, whereas the said motor only drives the cams 43 when rotating in the other direction, since the step-by-step driving mechanism is disengaged.

In FIG. 7, there has been illustrated the system by means of which the direction of rotation of the motor is controlled in dependence on a thermostat 45 which is in turn controlled by the temperature of the washing water of the machine. When the thermostat is cold, it closes the contact c but suddenly closes the contact d when it is hot. When the thermostat 45 is cold, the motor 39 rotates in the direction which only results in the driving of the cams 43 which has been referred-to above. In the position d, that is to say when the water in the washing machine has reached the desired temperature, the motor 39 rotates in the opposite direction and drives at the same time the cams 43 as well as the step-by-step mechanism which, as it effects its first movement of displacement, produces the rotation of the cam 46, the change-over switch 47 of which effects the closure of the circuit of the motor through the fixed contact a. A separate cam, not shown on the drawing and mounted on the same shaft with the cam 46, stops the heating.

It is obvious that the examples of construction of the improved programming device which have been described above and illustrated in the accompanying drawings have been given solely by way of indication and that any detail modifications can be made in the said examples without thereby departing from the scope or the spirit of the present invention.

What I claim is:

1. A programming device with rotary programming means, comprising: a step-by-step driving mechanism having and output shaft for driving said programming means; at least one selecting cam mounted on said output shaft; a motor having two directions of rotation with a driving pinion keyed on the shaft of said motor; a change-over switch operated by said selecting cam and connected to said motor for the purpose of controlling the direction of rotation of said motor; and transmission means for operatively coupling said motor to the step-by-step driving mechanism and formed, on the one hand, by a series of wheel-trains comprising toothed wheels integral with pinions and one countershaft pinion in mesh with one of said toothed wheels and, on the other hand, by a support rocking about an axis which coincides with the shaft of the motor and, mounted on said support, an intermediate pinion which is in mesh with the driving pinion and which is capable of engaging automatically, according to the direction of rotation of the motor, either with the countershaft pinion or with one of said toothed wheels other than the toothed wheel which is in mesh with said countershaft pinion, so that the wheel-trains are always able to move in the same direction of rotation, irrespective of the direction of rotation of the motor, but at different speeds according to the direction of rotation of said motor.

2. A programming device as claimed in claim 1, in which the countershaft pinion is engageable with that toothed wheel of the transmission gear trains which is located immediately after, in the direction of transmission of movement, the toothed wheel located nearest to that wheel with which the intermediate pinion mounted on the rocking support is adapted to come into engagement.

3. A programming device as claimed in claim 1, in which the motor having two directions of rotation is provided with two terminals for reversing the rotation thereof, while the output shaft carries a number of selecting cams mounted on said output shaft, comprising one change-over switch per selecting cam and operated by said selecting cam, said change-over switch having one movable contact and two fixed contacts with which said movable contact is adapted to co-operate, each series of homologous fixed contacts of the change-over switches being connected to one of the two terminals for reversing the direction of rotation of the motor, while the movable contacts of said change-over switches are each connected, through the intermediary of a selecting switch to one of the conductors supplying said motor, the combined assembly of said switches being so arranged that only one of said switches at a time can be closed, while the other switches remain open.

4. A programming device comprising: rotary programming means; a step-by-step driving mechanism having an output shaft for driving said programming means; an auxiliary control member which is driven by said output shaft; a motor having two directions of rotation; a change-over switch for controlling the direction of rotation of said motor; transmission means for operatively coupling said motor to said auxiliary control member and to said driving mechanism and comprising gear-trains and unidirectional coupling means for operatively coupling the motor at the same time both to said auxiliary control member and to said step-by-step driving mechanism but in one direction of rotation only of said motor, while in the other direction of rotation of said motor, the motor in question is operatively coupled only to said auxiliary control member, the step-by-step driving mechanism being then disengaged.

5. A programming device as claimed in claim 4, in which the auxiliary control member comprises a set of cams so arranged as to operate in both directions of rotation and electrical reversing means controlling a motor and operated by said set of cams.

6. A programming device as claimed in claim 4, additionally comprising a thermostat for the purpose of controlling the change-over switch governing the direction of rotation of the motor having two directions of rotation.

7. A programming device as claimed in claim 4, in which the unidirectional coupling means comprise a rotary elastic catch which is interposed between the transmission means and the step-by-step driving mechanism and which is provided with two oppositely facing teeth, and two locking pins operated in a single direction of rotation by means of said teeth and respectively carried by the step-by-step driving mechanism and by the transmission means.

8. A programming device having a step-by-step driving mechanism operated by driving means at constant speed and comprising: a supporting plate having a window; an output shaft supported by said plate; a ratchet wheel keyed on said output shaft and disposed on one side of said supporting plate; a holding pawl pivoting on said supporting plate; a spring serving to force back said retaining pawl against the teeth of the ratchet wheel; a control cam rotatably mounted on the other side of said supporting plate, a snug mounted on said cam and a roller mounted on said snug; a driving wheel co-axial with said control cam, rotating at a uniform speed and provided with a curved groove which is disposed co-axially and over an arc of approximately 90° and inside which penetrates the snug carried by the control cam, so as to ensure that said cam is given as it rotates, with respect to the driving wheel, freedom of angular movement corresponding to the length of the curved groove over the arc of a circle; a lever which is pivotally mounted on the supporting plate and a roller supported by said lever, between the two extremities of said lever; elastic means for accumulating energy and to which is hooked the free extremity of the pivoting lever so as to maintain contact between the lever roller and the control cam; a driving pawl coupled to said elastic means and adapted to execute a movement of translation and a pivoting movement, said driving pawl being operated by the roller mounted on the control cam and subjected to the opposing action of said elastic means and coming into engagement with the ratchet wheel so as to cause said ratchet wheel to move forward by one tooth, as each rotating movement of the control cam takes place.

9. A programming device as claimed in claim 8, in which the elastic means for accumulating energy consists of a spiral spring, one extremity of which is coupled to the pivoting lever and the other extremity of which is coupled to the driving pawl.

10. A programming device as claimed in claim 8, in which the supporting plate carries a pivot and in which the driving pawl is a small plate in which is formed an elongated slot through which said pivot passes, so that said small plate can carry out with respect to said pivot a pivotal movement and a movement of translation, said plate comprising: a fastening lug designed to couple said driving pawl to said elastic means for accumulating energy; a control catch for the purpose of actuating the ratchet wheel as each cycle of movement of said small plate takes place; and a heel operated by the roller carried by the control cam and adapted to move away from said roller in a certain angular position of said small plate with respect to said pivot, so as to be subjected to the action of said elastic means for accumulating energy, for the purpose of driving said ratchet wheel.

References Cited in the file of this patent
UNITED STATES PATENTS

| 2,145,942 | McAdams et al. | Feb. 7, 1939 |
| 2,896,873 | Mageoch | July 28, 1959 |
| 2,983,155 | Norton et al. | May 9, 1961 |
| 2,985,029 | Schneider | May 23, 1961 |